United States Patent
Yoshikawa et al.

(10) Patent No.: US 7,212,097 B2
(45) Date of Patent: May 1, 2007

(54) SERVICE PROVISION METHOD AND APPARATUS IN A DISTRIBUTED SYSTEM

(75) Inventors: Tatsuya Yoshikawa, Tokyo (JP); Shigetoshi Sameshima, Tokyo (JP); Katsumi Kawano, Tokyo (JP); Toshihiko Nakano, Tokyo (JP); Nobuhisa Kobayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 552 days.

(21) Appl. No.: 10/052,282

(22) Filed: Jan. 17, 2002

(65) Prior Publication Data

US 2002/0186121 A1 Dec. 12, 2002

(30) Foreign Application Priority Data

Jun. 11, 2001 (JP) .............................. 2001-174981

(51) Int. Cl.
*G05B 19/00* (2006.01)

(52) U.S. Cl. ................. 340/5.28; 340/825.49; 340/539.23; 340/572.1; 340/10.1; 340/825.69; 340/825.72; 340/10.42; 713/183; 713/186; 713/184; 713/185; 342/357.1; 342/357.17

(58) Field of Classification Search ............ 340/5.28, 340/825.49, 539.23, 572.1, 825.69, 825.72, 340/10.4; 455/410, 411, 414.2; 379/93.02; 713/183, 186, 184, 185; 342/357.1, 357.17
See application file for complete search history.

(56) References Cited

U.S. PATENT DOCUMENTS

| | | | | |
|---|---|---|---|---|
| 5,550,547 A | * | 8/1996 | Chan et al. ................... | 342/42 |
| 5,886,634 A | * | 3/1999 | Muhme .................... | 340/572.1 |
| 5,929,778 A | * | 7/1999 | Asama et al. ............ | 340/10.51 |
| 6,232,877 B1 | * | 5/2001 | Ashwin .................... | 340/572.1 |
| 6,567,486 B1 | * | 5/2003 | Gordon et al. .............. | 375/360 |
| 6,600,418 B2 | * | 7/2003 | Francis et al. ........... | 340/572.1 |
| 6,823,244 B2 | * | 11/2004 | Breed .......................... | 701/29 |

FOREIGN PATENT DOCUMENTS

| | | |
|---|---|---|
| EP | 0992873 A2 | 4/2000 |
| JP | 2000-112891 | 4/2000 |

* cited by examiner

*Primary Examiner*—Brian Zimmerman
*Assistant Examiner*—Vernal Brown
(74) *Attorney, Agent, or Firm*—Townsend and Townsend and Crew LLP

(57) ABSTRACT

Access to restricted areas or devices are controlled by based on collecting information about the surrounding environment in connection with those restricted areas or service devices. Generally, one refers to service devices and access to service devices. Area access control can be viewed as being provided by a service device (e.g., an automated door or gate), access to which permits entry to (or exit from) a controlled area. Information about the surrounding environment includes, but is not limited to, the presence or absence of particular individuals, the presence or absence of other service devices, the location and/or proximity of other service devices, the location of the user requesting access to the service device, and so on. Based on knowledge of the surrounding environment, service access to the device can be permitted or denied.

11 Claims, 23 Drawing Sheets

FIG.11

| # | DATE AND TIME DATA SENT | USER ID | GROUP ID | REQUESTED SERVICE ID |
|---|---|---|---|---|
| 1 | 20010627122235606 | usr_676001027 | grp_105 | e-key_room_a |
| 2 | 20010820152331302 | usr_676001028 | grp_301 | print_room_b |
| ⋮ | ⋮ | ⋮ | ⋮ | ⋮ |
|   | 1110 | 1111 | 1112 | 1113 |

FIG.12

| # | DATE AND TIME DATA RECEIVED | USER'S PERIPHERAL DEVICE INFORMATION |
|---|---|---|
| 1 | 2001062712235606 | [info_udev] |
| 2 | 2001082015231302 | [info_udev] |
| . . . | . . . | . . . |

FIG.13

| ACCESS LEVEL (1310) | GROUP ID (1311) | USER'S PERIPHERAL DEVICE INFORMATION (1312) | EQUIPMENT PERIPHERAL DEVICE INFORMATION (1313) |
|---|---|---|---|
| 1 | grp_105 | [info_udev] | [info_ddev] |
| 2 | grp_301 | [info_udev] | [info_ddev] |
| ... | ... | ... | ... |

FIG.14

| ACCESS LEVEL | EXECUTION PROCESSING | ACCESS RIGHTS |
|---|---|---|
| 0 | PROCESSING 1 | × |
|  | PROCESSING 2 | × |
|  | PROCESSING 3 | × |
|  | . . . | . . . |
| 1 | PROCESSING 1 | × |
|  | PROCESSING 2 | ○ |
|  | PROCESSING 3 | × |
|  | . . . | . . . |
| . . . | . . . | . . . |

1410 — ACCESS LEVEL
1411 — EXECUTION PROCESSING
1412 — ACCESS RIGHTS

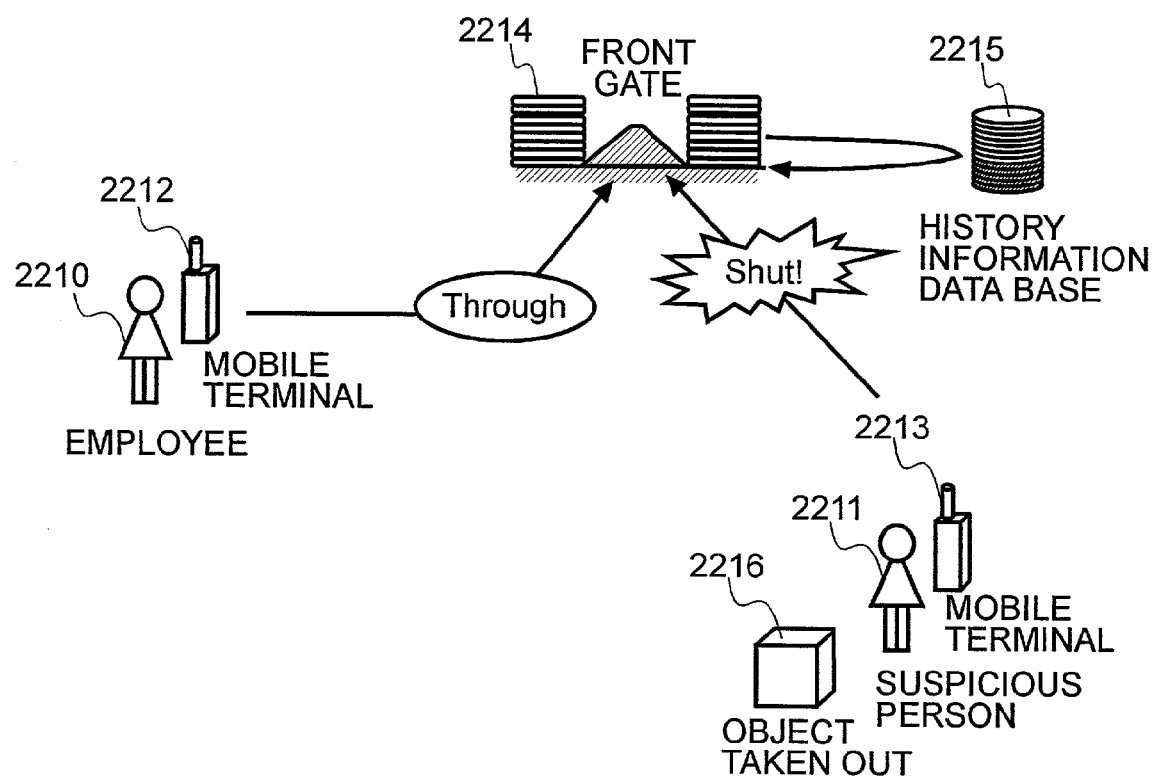

| # | TIME | STATUS (VALUE) | PERIPHERAL EQUIPMENT |
|---|---|---|---|
| 1 | 2001.1.1.16:25:06 | ON | PC_2L, ELV_2L, ... |
| 2 | 2001.1.2.12:55:26 | OFF | PC_1L, ELV_1L, ... |
| ... | ... | ... | ... |

FIG.26

| ACCESS LEVER 2610 | TARGET EQUIPMENT 2611 | REFERENCE STARTING POINT 2612 | REFERENCE END POINT 2613 | HISTORY INFORMATION 2614 |
|---|---|---|---|---|
| 0 | EQUIPMENT 1, ... | P: BOOKS<br>S: LOAN ALLOWED<br>T: 2001.1.1.16:25:06<br>... | P: FRONT GATE<br>S: LOAN NOT PERMITTED<br>T: 2001.1.1.16:25:06<br>... | P [REQUESTED EQUIPMENT]<br>P [REQUESTED EQUIPMENT], S [REQUESTED EQUIPMENT], ...<br>P [REQUESTED EQUIPMENT], T [REQUESTED EQUIPMENT], ...<br>... |
| 1 | EQUIPMENT 2 ... | | | |
| ... | | | | |

SERVICE PROVISION METHOD AND APPARATUS IN A DISTRIBUTED SYSTEM

CROSS-REFERENCES TO RELATED APPLICATIONS

This application is related to and claims priority from Japanese Patent Application No. 2001-174981, filed on Jun. 11, 2001.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to the control of a device that executes prescribed functions. In particular, it targets the field of security in which access to all types of devices is controlled using information such as an access control list (ACL). The present invention further relates to technology that can be applied in fields such as entry and exit management, theft prevention, and goods management.

Conventional access control methods in distributed systems in which a multiplicity of devices are located include the method described in European Patent Application No. 99307937.5 (EP 0 992 873 A2). In this method, access was controlled to suit user attributes by providing a distributed access control list (ACL) for each device within the system. The work involved in settings was reduced and setting errors prevented by enabling settings to be made without having to login each time to the computer for which the settings were required.

However, one of the limitations of the above conventional technology was that, in situations in which, for example in an office building visited by various users, entry was prohibited into restricted areas that housed important objects but allowed in other cases, conventional standardized access control suffered because of the time delays that occurred after settings relating to the access levels of operators and managers were altered or requests were made to change user settings.

SUMMARY OF THE INVENTION

Apparatus for service provision is made in accordance with a method comprising obtaining a request for service from a requesting device. Peripheral information about devices proximate the service device or proximate the requesting device is obtained. Service is provided based at least on the peripheral information. In another aspect of the invention, history information relating to at least one of the service device and the requesting device is a further basis for whether or not the service is provided. In still another aspect of the invention, information relating to the user of the requesting device is a further basis for whether or not the service is provided.

BRIEF DESCRIPTION OF THE DRAWINGS

FIG. 11 shows the information sent from the user according to an embodiment of the present invention;

FIG. 12 shows the user's peripheral device information according to an embodiment of the present invention;

FIG. 13 shows the EACL that uses the peripheral device information according to an embodiment of the present invention;

FIG. 14 shows the relationship between access levels and executable processing according to an embodiment of the present invention;

FIG. 22 shows the constitution of the system of a fourth illustrative embodiment in which the access control method in the present invention is applied;

FIG. 23 shows the EACL in which the access level changes according to the period of time during which a service is requested or provided according to an embodiment of the present invention;

FIG. 26 shows the EACL when a history information data base is used in the present invention.

DESCRIPTION OF THE SPECIFIC EMBODIMENTS

Figure 1:
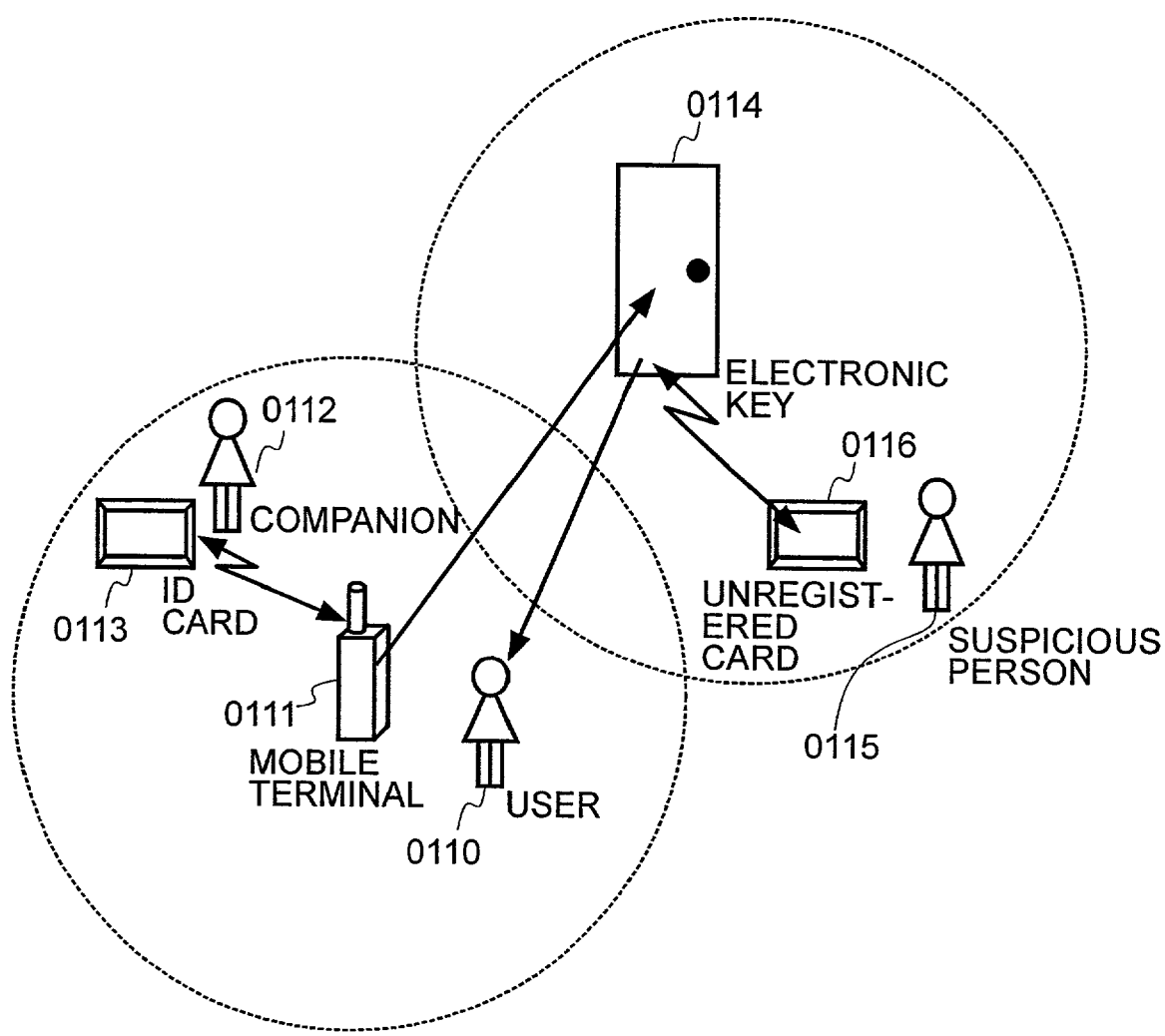
FIG. 1 shows an aspect of the application of an access control system in an example embodiment of the present invention.

A brief introduction to various aspects of the present invention is presented before discussing the specific illustrative embodiments. In each of its various aspects, the present invention processes information for service provision including access control to suit peripheral information relating to the device. Peripheral information is information relating to operational state of various devices detected within a prescribed area around a service-providing device, and provides the conditions for service provision to be given by the service-providing device (or more succinctly, the "service device"). Peripheral information includes information that shows the status of other devices within a prescribed range around the prescribed device. The status of other devices includes whether or not other devices (pre-determined) exist, and the operating status of other devices. Peripheral information also includes information that shows whether or not the person who will receive a service is present in the prescribed range around a device and whether or not that person has the right to receive that service.

Peripheral information also includes history information related to a device, either or both the service-providing device and a service requesting device. For example, history information may include a record of people or other devices requesting service from a service-providing device, a record of other devices that have come or been brought within the proximity of the device (e.g., people passing the device), identification of different locations of the device (e.g., a piece of equipment may be carried from one location to another), a record of environmental conditions of a location of the device (e.g., temperature, forces due to acceleration, etc.), and so on. It can be concluded from the foregoing that the history information may contain a wide variety of data which can be stored and subsequently accessed in making a determination whether to grant a requested service.

Generally, the present invention controls whether or not a service device will provide a prescribed service in accordance with whether or not a requesting device that requests a service satisfies certain conditions for the requested service. For example, whether the requesting device exists within a prescribed range from the service device that will provide a prescribed service and in accordance with whether or not a peripheral device that allocates rights to receive a service exists within a prescribed range from the service device or requesting device.

An example will be explained in an illustrative embodiment in which the service device is something such as a door that controls entry and exit, in which the requesting device is a mobile telephone, and in which the peripheral device is an ID card that stores information to electronically identify an individual or an organization. In this example, a command to open a door with a key to enable entry into a prescribed room, is sent from a mobile telephone to the door. When the control device that controls the locking and unlocking of a door by a key receives the command, if an ID card that identifies an individual who is allowed entry to this room exists within the prescribed range from the door or mobile telephone, it will unlock the door in response to the request from the mobile telephone. The existence of the ID card can also be confirmed by the issue of radio waves from the control device.

The present invention also includes the ability to change a device that can access a service device (user who can receive a service) to suit peripheral information.

Various illustrative embodiments of the present invention will now be described in connection with the figures.

FIG. 1 is an aspect of the application of an access control system in the present invention. Its main components include: a user 0110 who requests a service from a service device (electronic lock) 0114; a mobile terminal 0111 that provides a user interface; a user's peripheral devices (for example, an ID card and mobile terminal) 0113 owned by a companion 0112 existing in the periphery of the mobile terminal 0111; a service device (electronic lock) 0114 that provides a service requested by a user; and peripheral devices (for example, an unregistered ID card and mobile terminal 0116 held by a suspicious person 0115 located near the service device (electronic lock) 0114.

Figure 2:
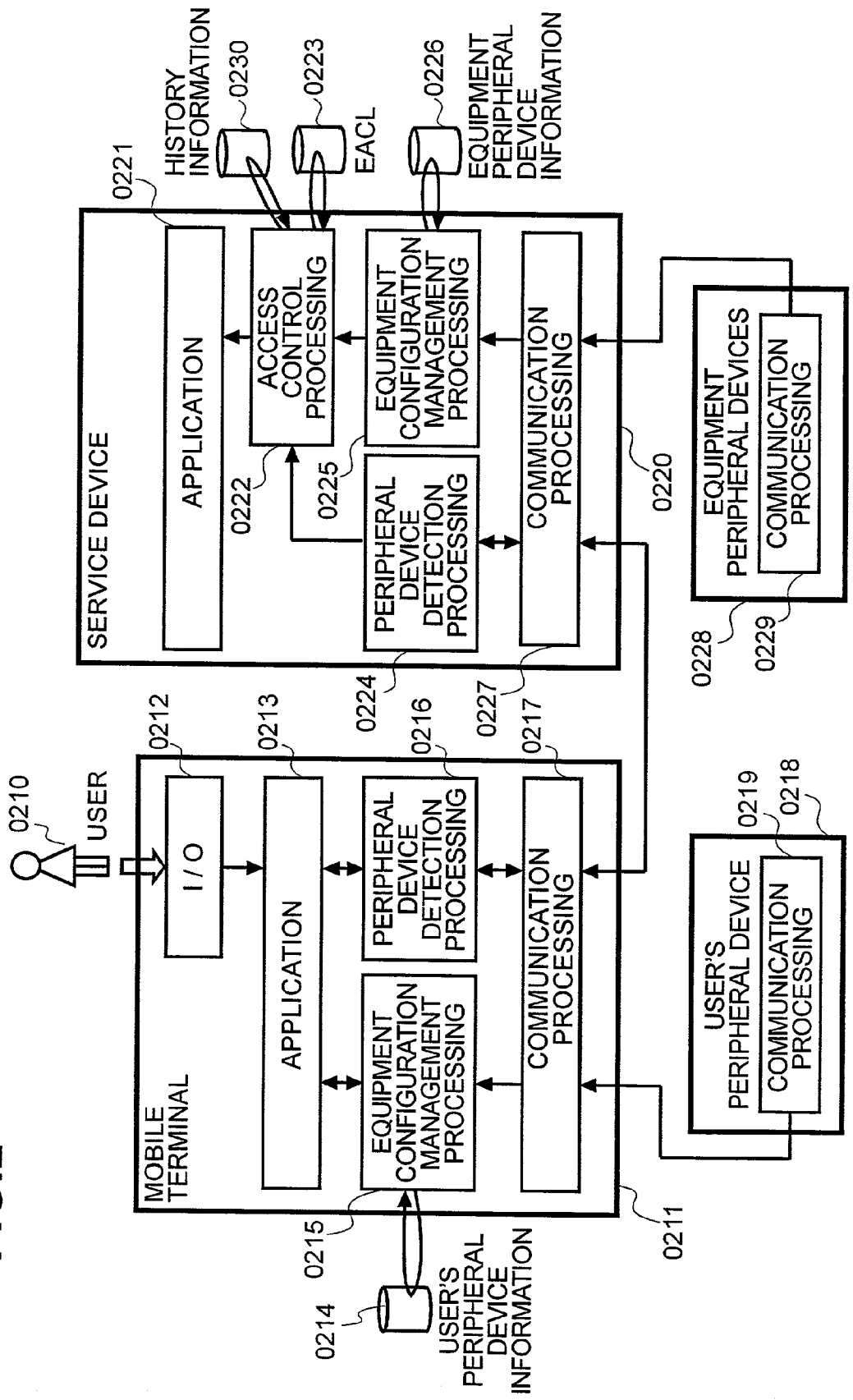
FIG. 2 shows constitution of an access control system according to an embodiment of the present invention.

FIG. 2 is a schematic view of the access control system in the present invention. Its main components are a user 0210, mobile terminal (service requesting device) 0211, service device 0220, one or more user's peripheral devices 0218, and zero or more equipment peripheral devices 0228. User's peripheral devices refers to devices within a detectable periphery of the user, while equipment peripheral devices refers to devices within a detectable periphery about a service device. In this system, a multiplicity of devices are scattered around in the environment, an extended access control list (EACL) 0223 is stored in the hard disk of each service device 0220, and there are radio communication modules (that can use prescribed communication technology) that use a common communication protocol.

The user 0210 requests the necessary service via a mobile terminal 0211 (for example a mobile telephone or PDA) and receives the service from the service device 0220. The user 0210 uses the mobile terminal 0211 to send personal verification information (user ID: 676001027, group ID: 105u) or service information (requested service ID: unlock interview room) to the service device.

Note here that the personal verification information is stored in the mobile terminal 0211 and the service information can be selected from a list of services acquired via a network. The peripheral device detection processing 0216 in the mobile terminal 0211 sends a peripheral device detection signal to communication processing 0217 in the mobile terminal 0211. The communication processing 0217 implements broadcast transmission of a send device information request signal to peripheral devices. When a user's peripheral device 0218 that exists within the wireless communication receives the send device information request signal, it uses communication processing 0219 to send the status of the peripheral device (for example, operating or sleeping)

and its own unique global ID (peripheral device ID: F0032A8) to communication processing 0217. The communication processing 0217 that receives the peripheral device information sends the information to peripheral device detection processing 0216. The peripheral device detection processing 0216 that receives the peripheral device information writes this peripheral device information into a table in the user's peripheral device information data base 0214.

Furthermore, peripheral device detection processing 0216 combines peripheral device information with personal verification information or requested service information sent first from the user 0210, and sends this to the service device 0220. Peripheral device detection processing 0216 is always activated and detects a user's peripheral devices 0218 at regular intervals. The access control processing 0222 in the service device 0220 that receives user information or user peripheral information requests that its own peripheral devices around equipment detection processing 0224 collects information about equipment peripheral devices 0228 near the service device 0220. The peripheral device around equipment detection processing 0224 that receives the request uses the same processing as the user's peripheral device detection processing 0216 in the above mobile terminal 0211 to acquire information relating to equipment peripheral devices 0228. In addition, it writes the acquired peripheral device information into a table in the peripheral device information DB 0226. The peripheral device around equipment detection processing 0224 sends the acquired peripheral device information to access control processing 0222.

The access control processing 0222 that receives the peripheral device information refers to the EACL 0223 stored in the service device 0220. At this time, it uses the user information or user's peripheral information and the above service device peripheral information received from the mobile terminal 0211. By referring to the received information (user ID, group ID, requested service ID, user's peripheral device information, and equipment and peripheral device information) and the EACL 0223, the access control processing 0222 determines the access level. Note here that the access level is also sometimes determined by referring to the history information 0230 relating to the user's peripheral devices 0218 and the user 0210. This is then compared with the access level determined after reference to the EACL 0223, and the access level determined in accordance with a given policy (for example, use the lowest access level). Access control processing 0222 controls the service device 0212 with the determined access level mode and provides the service to the user 0210. Detailed explanation of the flows of information and services at this time are provided in FIGS. 3 through 9.

It is also noted here that a service device 0220 can also request that the above user personal information and user peripheral information be sent at any time, not only when a request for a service has been sent from a user 0210.

Figure 3:
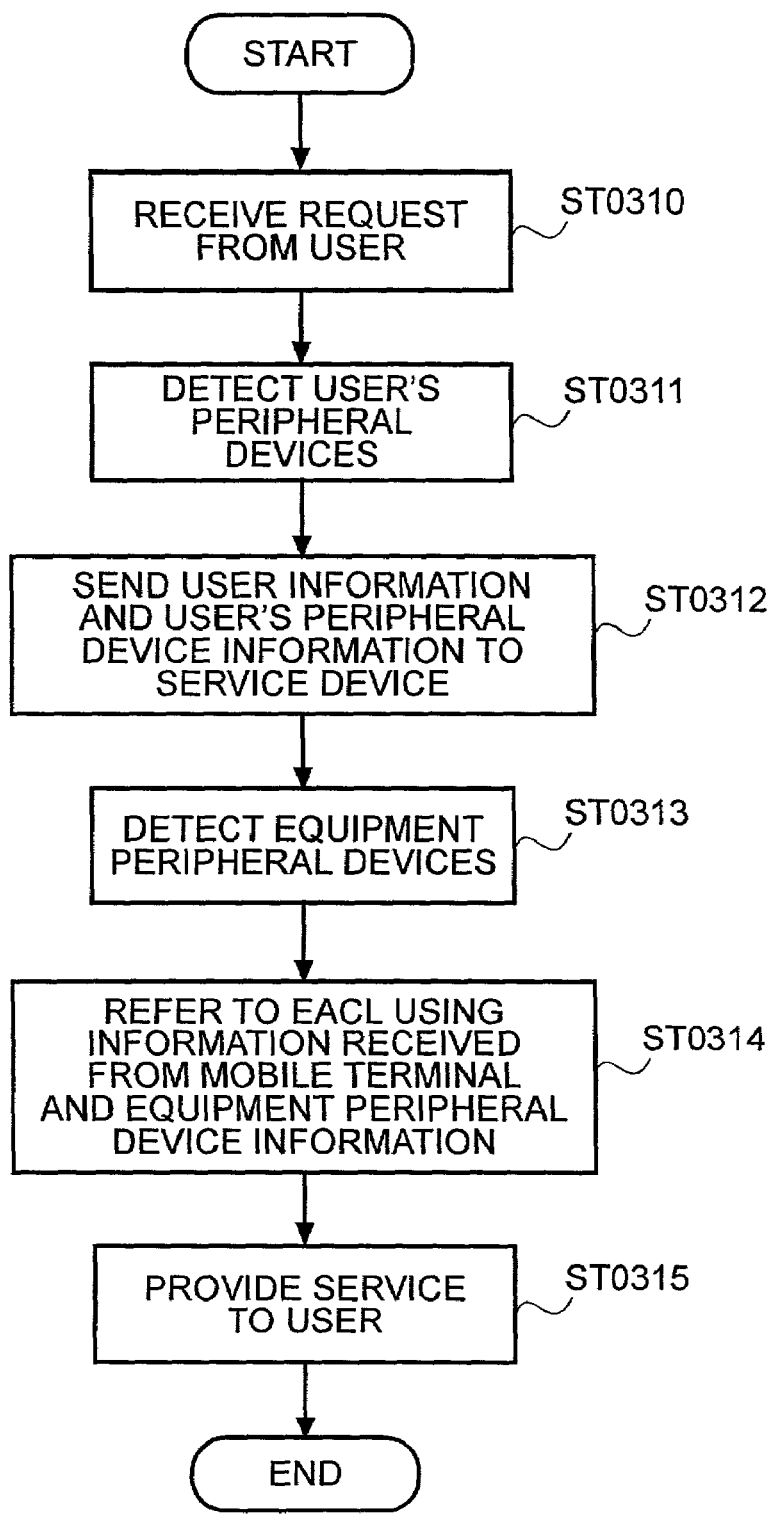
FIG. 3 is a flowchart that shows processing throughout the system according to an embodiment of the present invention.

FIG. 3 is a flowchart that shows processing throughout the system in the present invention. In ST0310, a user 0210 requests a service of a service device 0220 via a mobile terminal 0211. Here, the user 0210 uses a mobile terminal 0211 to either clearly enters their user ID, group ID, and requested service ID or selects one of the items stored in the mobile terminal 0211 and sends a message to the service device 0220. In ST03 11, the mobile terminal 0211 that receives the send user information message request starts to detect the user's peripheral devices 0218. The mobile terminal 0211 receives the device information from the user's peripheral devices 0218.

It also checks whether or not there are any other peripheral devices in existence. If a user's peripheral devices 0218 exist, processing is repeated. If there are no user's peripheral devices 0218, processing proceeds to ST0312. In ST0312, the user ID, group ID, and requested service ID entered by the user 0210 or stored in the mobile terminal 0211 is combined with the user's peripheral device information acquired in ST0311 and sent to the service device 0220.

In ST0313, when a service request message is received from a mobile terminal 0211, a search for equipment peripheral devices 0228 starts. The service device 0220 receives device information from equipment peripheral devices 0228. It also checks whether or not other peripheral devices exist and repeats processing if equipment peripheral devices 0228 exist. If equipment peripheral devices 0228 do not exist, processing proceeds to ST0314. In ST0314, information received from the mobile terminal 0211 and information relating to equipment peripheral devices 0228 acquired in ST0313 are used in referring to the EACL, and the access level determined. In ST0315, the user 0210 is provided with the service based on the access level determined in ST0314.

Figure 27:
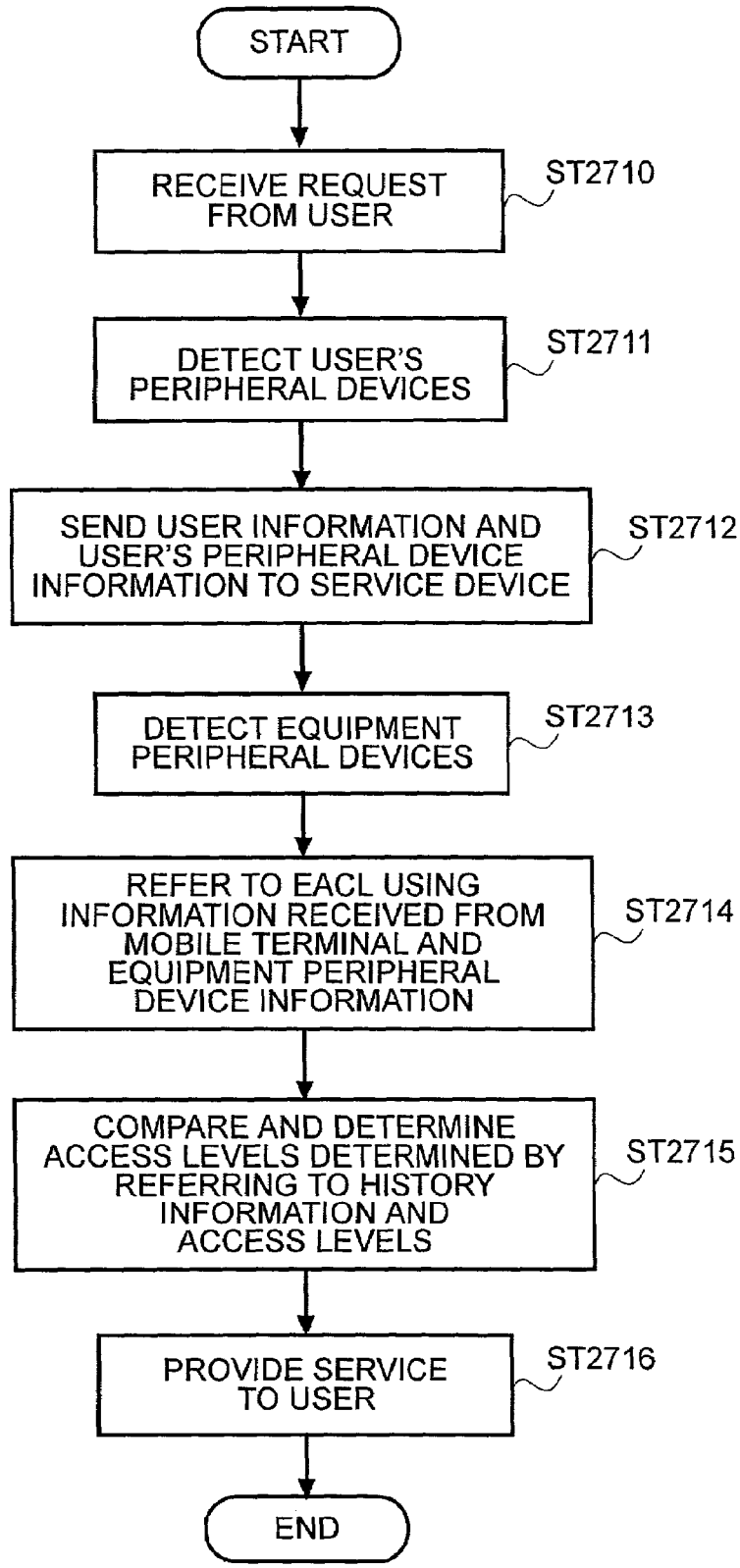
FIG. 27 is a flowchart that shows processing throughout the system according to an embodiment of the present invention when a history information data base is used.

FIG. 27 is a flowchart that shows the processing throughout a system that uses a history information data base in the present invention. The processing from ST2710 through ST2714 is the same as that from ST0310 through ST0314. ST2715 determines the access level after referring to the history information DB 0230. Which of the determined access level and the access level determined in ST2714 will be used is determined in accordance with a policy (for example, the lowest access level will be selected). In ST2716, the user 0210 is provided a service based on the access level determined in ST2715.

Figure 4:
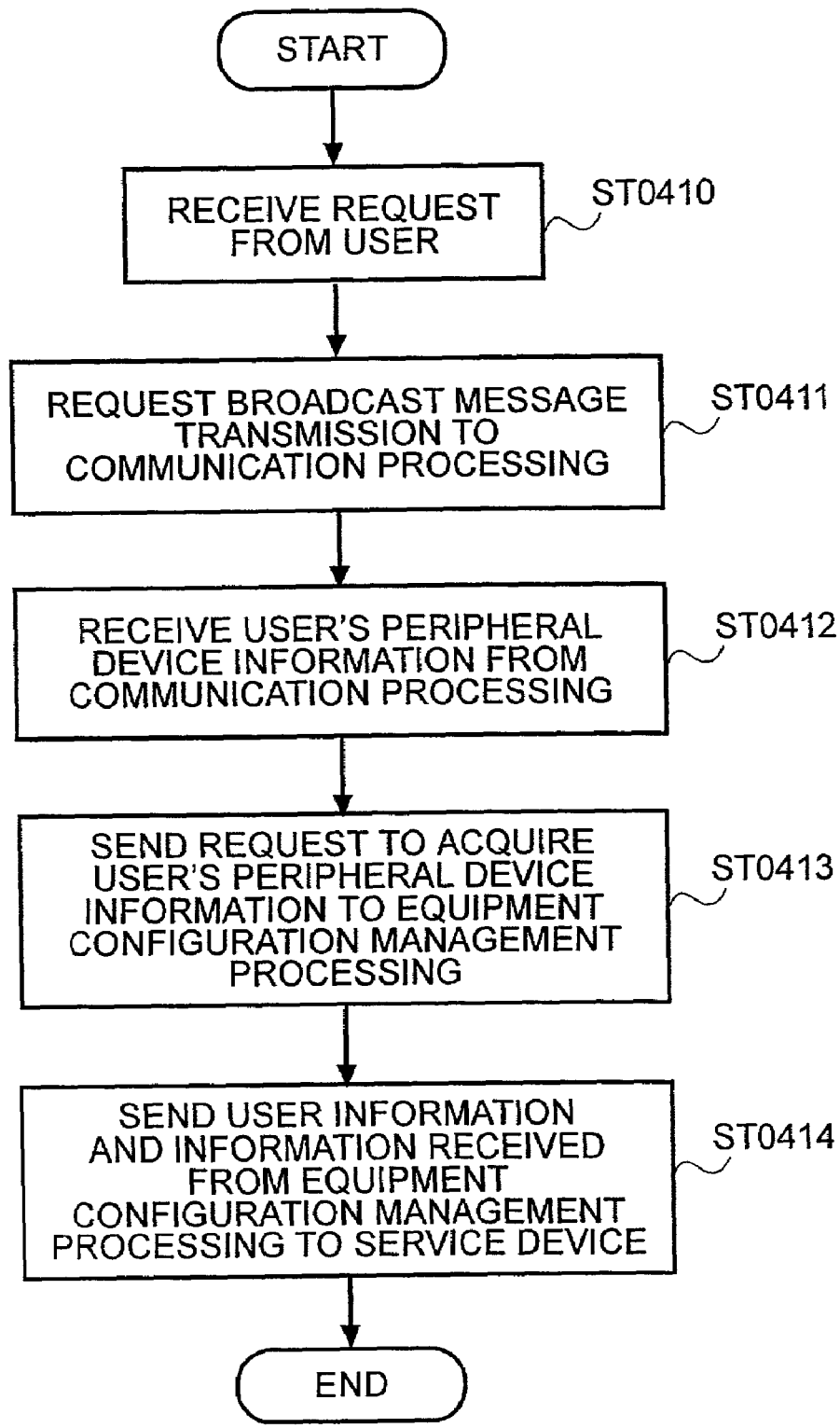
FIG. 4 is a flowchart that shows peripheral device detection processing in a mobile terminal according to an embodiment of the present invention.

FIG. 4 is a flowchart that shows the peripheral device detection processing that occurs in a mobile terminal in the present invention. In ST0410, I/O 0212 from the user 0210 and user information and service requests are received via an application 0213. In ST0411, a peripheral device search request is sent to communication processing 0217. Specifically, a request to send a broadcast message is sent to all devices. In ST0412, the peripheral device information sent from a user's peripheral device 0218 to communication processing 0217 is received. In ST0413, a request to acquire information relating to a user's peripheral devices 0218 is sent to equipment configuration management processing 0215. In ST0414, user information and the information received from equipment configuration management processing 0215 is sent to the service device 0220.

Figure 5:
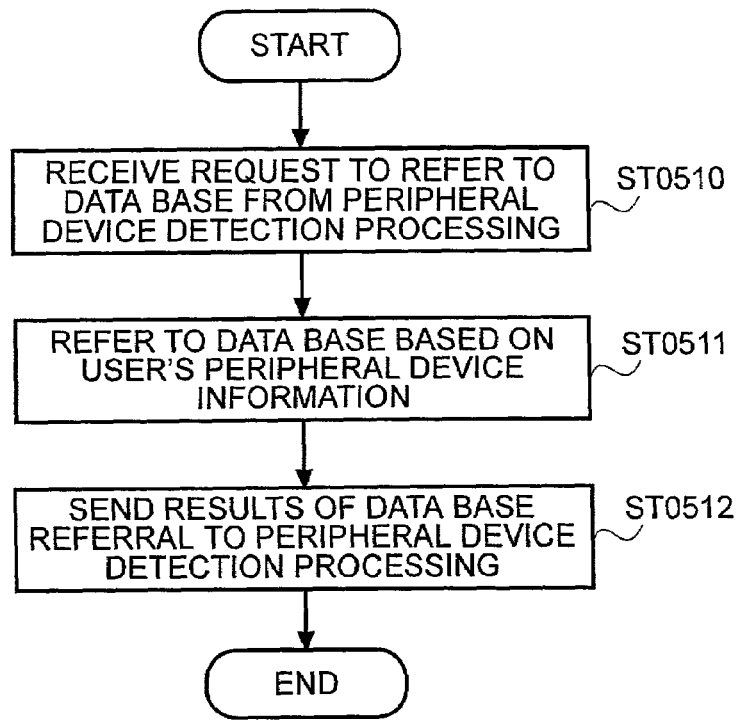
FIG. 5 is a flowchart that shows the equipment configuration management processing (non-resident processing) in a mobile terminal according to an embodiment of the present invention.

FIG. 5 is a flowchart that shows equipment configuration management processing (non-resident processing) in a mobile terminal in the present invention. In ST0510, a reference request is sent from peripheral device detection processing 0216 to the user's peripheral device information data base 0214. In ST0511, reference is made to the user's peripheral device information data base 0214 based on the user's peripheral device information. In ST0512, the results of the reference obtained in ST0511 are sent to peripheral device detection processing 0216.

Figure 6:
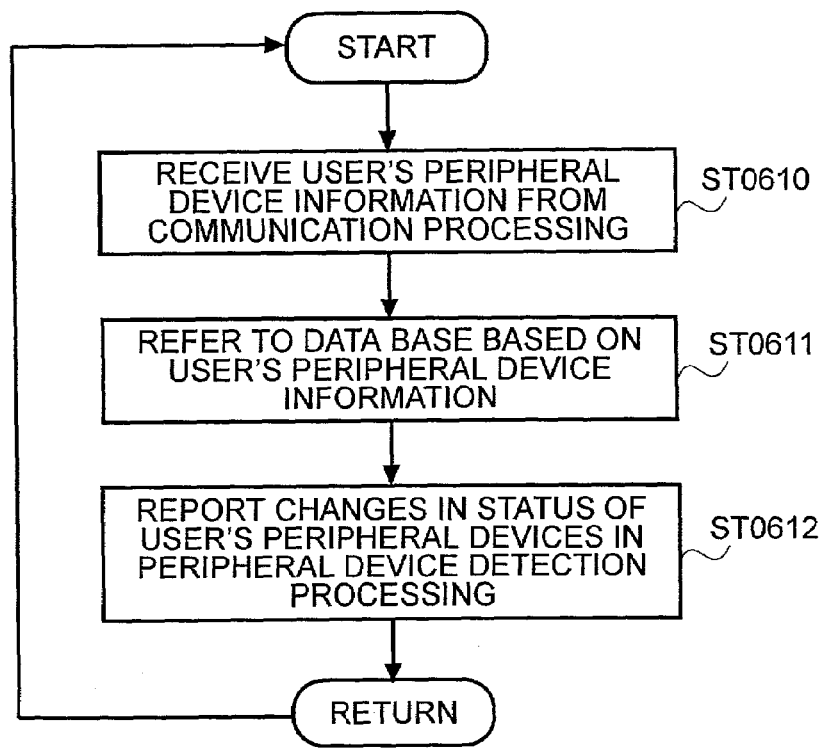
FIG. 6 is a flowchart that shows the equipment configuration management processing (resident processing) in a mobile terminal according to an embodiment of the present invention.

FIG. 6 is a flowchart that shows equipment configuration management processing (resident processing) in a mobile terminal in the present invention. In ST0610, a user's peripheral device information is received from communication processing 0217. In ST0611, reference is made to a user's peripheral device information data base 0214 based on the user's peripheral equipment information. In ST0612, any changes in the status of a user's peripheral device 0218 are reported to peripheral device detection processing 0216. Processing then returns to ST0610.

Figure 7:
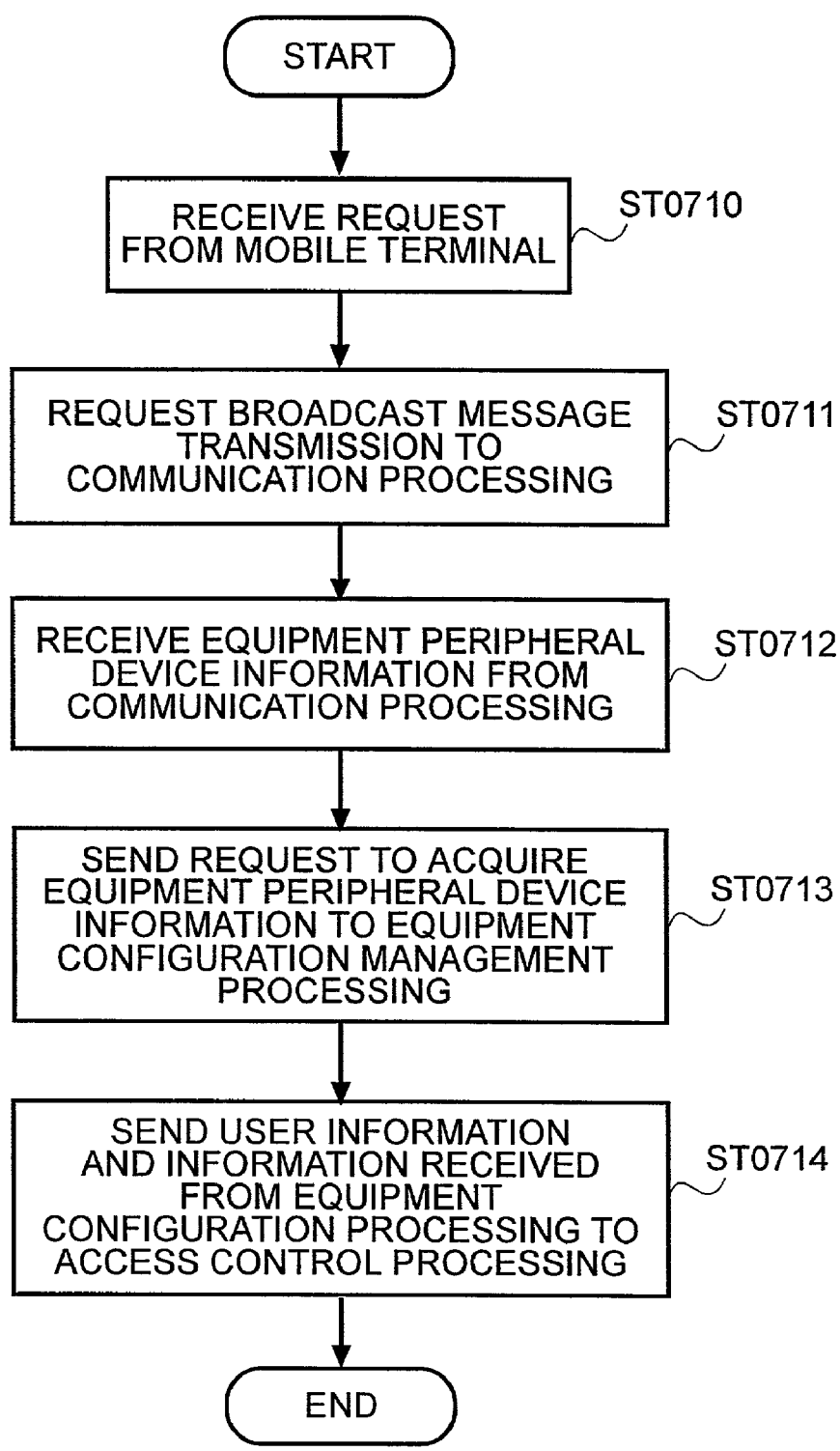
FIG. 7 is a flowchart that shows the peripheral device detection processing in a service device according to an embodiment of the present invention.

FIG. 7 is a flowchart that shows peripheral device detection processing in a service device in the present invention. In ST0710, a service request is received from a mobile terminal 0211. In ST0711, a peripheral device retrieve request is sent to communication processing 0227. Specifically, a request to send a broadcast message to each device is sent. In ST0712, peripheral device information sent to communication processing 0227 from equipment peripheral devices 0228 is received. In ST0713, a request to acquire information relating to equipment peripheral devices 0228 is sent to equipment configuration management processing 0225. In ST0714, user information and information received from equipment configuration management processing 0225 is sent to access control processing 0222.

Figure 8:
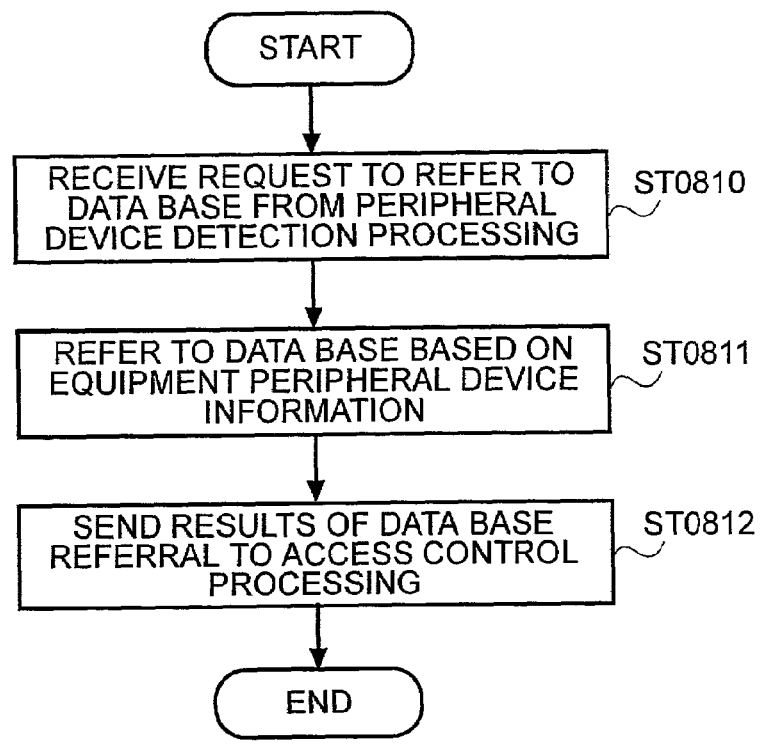
FIG. 8 is a flowchart that shows the equipment configuration management processing (non-resident processing) in a service device according to an embodiment of the present invention.

FIG. 8 is a flowchart that shows equipment configuration processing (non-resident processing) in a service device according to the present invention. In ST0810, a reference request sent from peripheral device detection processing 0224 to the equipment and peripheral device information data base 0226 is received. In ST0811, reference is made to the peripheral device around equipment information data base 0226 based on information relating to equipment peripheral devices 0228. In ST0812, the results of the referral made in ST0811 are sent to peripheral device detection processing 0224.

Figure 9:
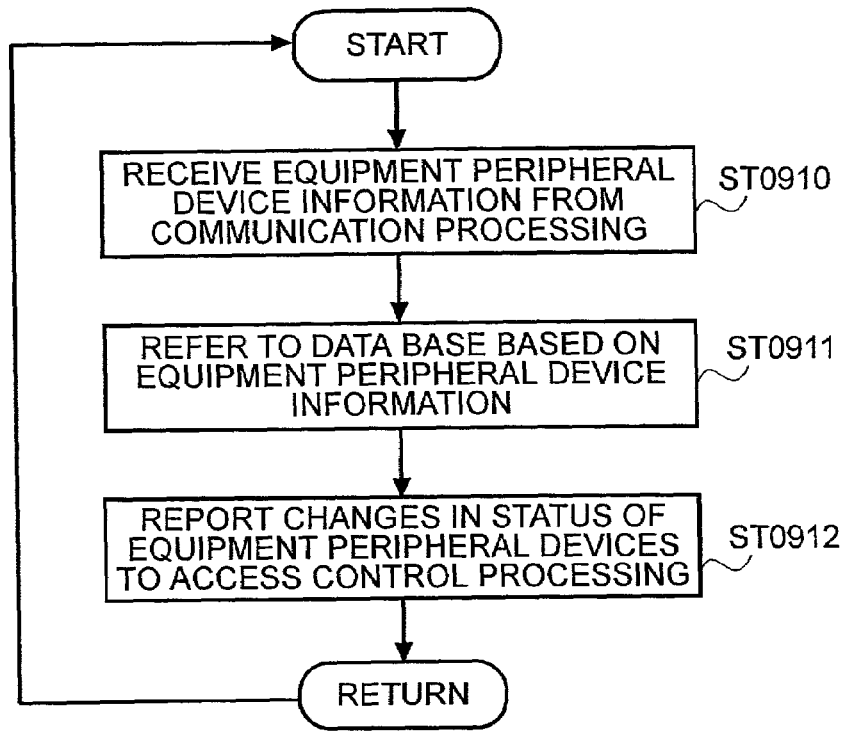
FIG. 9 is a flowchart that shows the equipment configuration management processing (resident processing) in the service device according to an embodiment of the present invention.

FIG. 9 is a flowchart that shows the equipment configuration management processing (resident processing) in a service device in the present invention. In ST0910, information relating to equipment peripheral devices 0228 is received from communication processing 0227. In ST0911, reference is made to the peripheral devices around equipment information data base 0226 based on the information relating to equipment peripheral devices 0228. In ST0912, changes in the status of equipment peripheral devices 0228 are reported to access control processing 0222. Processing then returns to ST0910.

Figure 10:
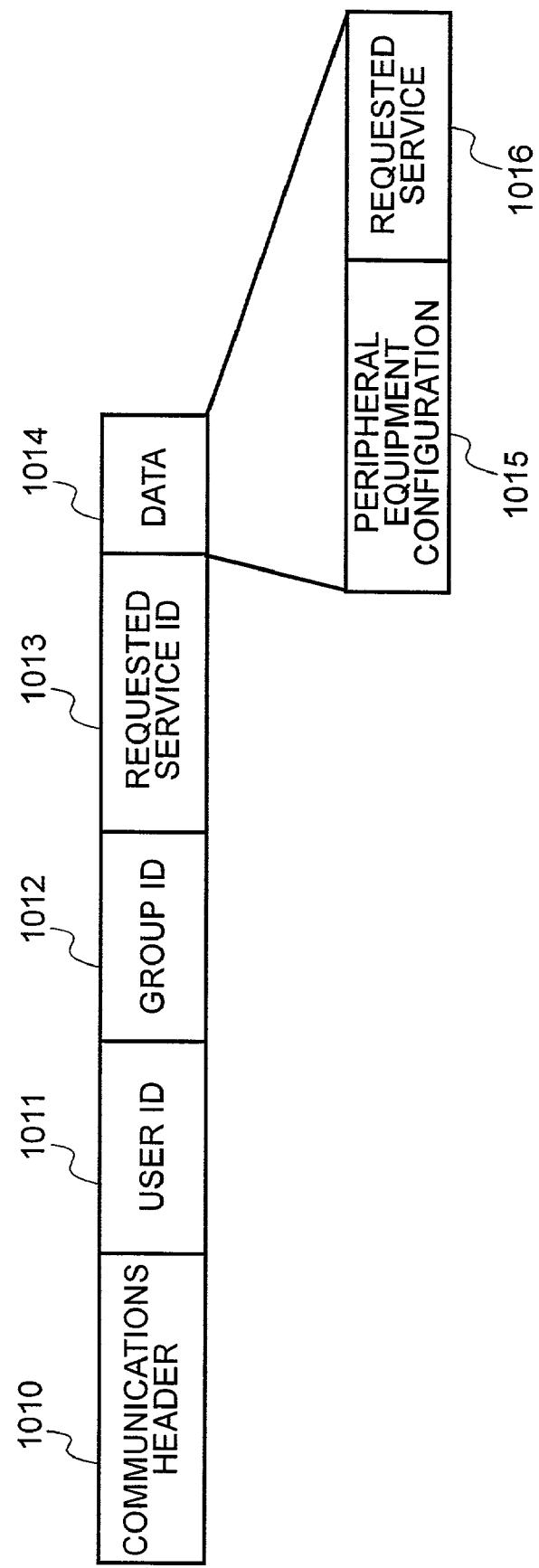
FIG. 10 shows a message sent by a user via a mobile terminal when requesting a service according to an embodiment of the present invention.

FIG. 10 shows a message sent when a user requests a service via a mobile terminal in the present invention. The above message comprises a communication header 1010 and data 1014. Its main elements include the user ID 1011 used for user verification, the group ID 1012 of the group to which the user belongs, and the requested service 1013 that the user requests of the service device. The main elements in the data 1014 include the peripheral equipment configuration 1015 relating to the user's peripheral devices, and the requested service 1016.

FIG. 11 shows the information sent from the user in the present invention. The main elements of this information include: the sending date and time 1110 that shows the time at which data was sent from the user; the user ID 1111 that specifies the user; the group ID 1112 that shows the group to which the user belongs; and the requested service ID 1113 for the service requested of the service device 0220 by the user 0210.

FIG. 12 shows the user's peripheral device information in the present invention. The main components of this information include the reception date and time 1210 that shows the time at which the periphery was detected and data obtained, and the user's peripheral device information 1211 for devices around the user (including ID and status values). Note here that the user's peripheral device information 1211 is only valid when the user has peripheral devices 0218.

FIG. 13 shows the EACL that uses the peripheral device information in the present invention. The main components are: the access level 1310 provided for the user for accessing the service devices in the EACL; group ID 1311 for the group to which the user belongs; the user's peripheral device information (including ID and status value) 1312 for devices existing around the user, and information relating to peripheral devices around the equipment (including ID and status value) 1313 for devices around the service device. Note here that the user's peripheral information 1312 and information relating to equipment peripheral devices 1313 are only valid when there are user's peripheral devices 0218 and equipment peripheral devices 0228.

FIG. 23 shows an EACL in which access levels change according to the period of time during which a service is requested or provided in the present invention. The main components include reception information 2310, the period of time 2311, and the access level 2312. Reception information 2310 comprises a group ID 1311 received from the above user, user's peripheral device information (including ID and status value) 1312, and information relating to peripheral device around equipment (including ID and status value) 1313 for peripheral devices located around the above service device. The period of time 2311 refers to the time during which a service is requested or provided. Access level 2312 has the same value as the above access level 1310. Even when the same information is received, different access levels may be provided because of the time at which the service is requested or provided.

FIG. 14 shows the relationship between access levels and processing that can be executed in the present invention. The main components include: the access level 1410 determined in the above access control processing; the execution processing 1411 that can be executed in the service device; and access rights 1412 that show whether or not execution processing can be implemented for all access levels.

Figure 15:
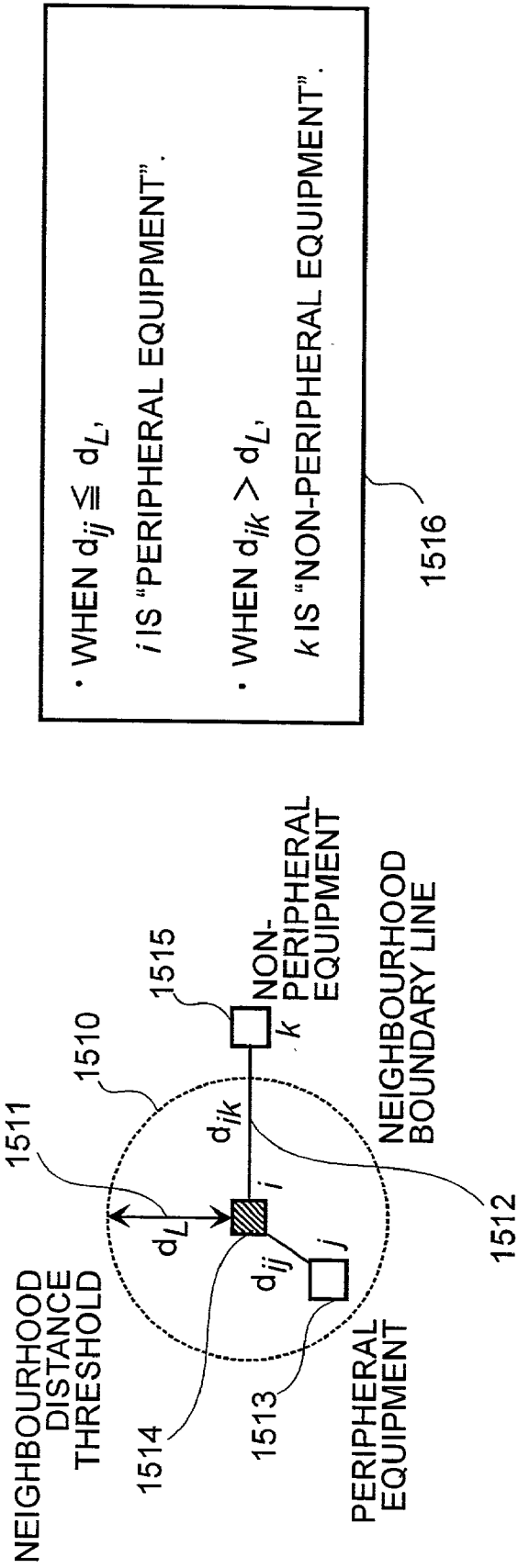
FIG. 15 shows the judgment standards for peripheral devices according to an embodiment of the present invention.

FIG. 15 shows the judgment standards for peripheral devices in the present invention. The configuration used here is a circle of radius dL 1511 centered around device i 1514 equipped with peripheral device detection processing 0214 for peripheral devices such as mobile terminals 0211 and service devices 0212. Here, dL is a neighborhood distance threshold for a particular device. The circumference of the circle is the neighborhood boundary line 1510. The distances between device i 1514 and peripheral device j 1513 or non-peripheral device k 1515 are measured using an infrared contact sensor. The distances between the device i 1514 and peripheral device j and non-peripheral device k are dij 1512 and dik 1512 respectively. Here, it is judged whether the device targeted using inequality 1516 is a peripheral device j 1513 of device i 1514 or a non-peripheral device k 1515.

Figure 16:
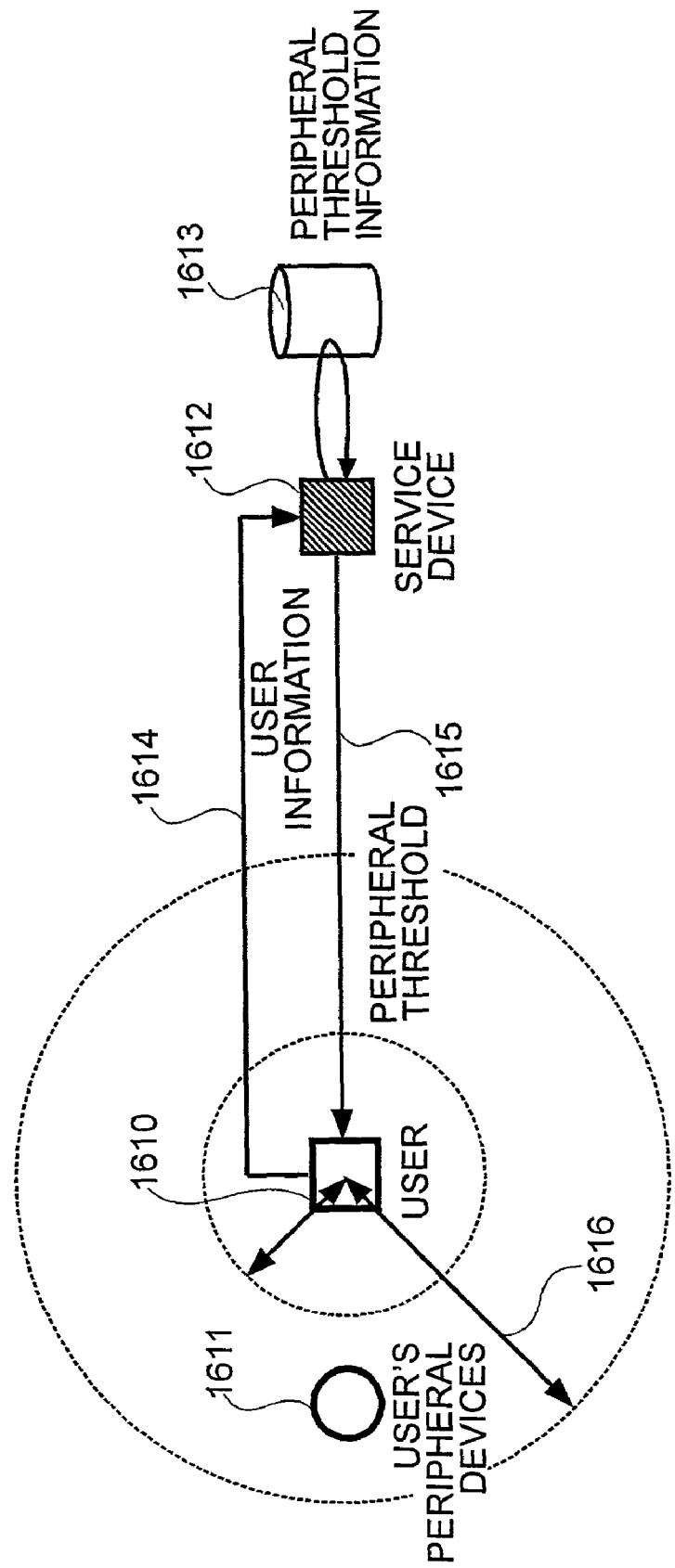
FIG. 16 shows a method for fixing a peripheral threshold (neighborhood distance threshold) according to an embodiment of the present invention.

FIG. 16 shows a method for fixing the peripheral threshold value (neighborhood distance threshold) in the present invention. The main components include a user 1610, a user's peripheral device 1611, a service device 1612, peripheral threshold information 1613, user information 1614, and a peripheral threshold 1615. The user 1610 sends user information 1614 (including user ID, group ID, and requested service ID) via a mobile terminal 0211 to a service device 1612. The service device 1612 that receives the above user information 1614 refers to the peripheral threshold information data base and determines the peripheral threshold 1615.

Here, the information used is the above user information 1614 and the service device 1612 information. The determined peripheral threshold 1615 is sent to the mobile terminal 1610 of the user. The mobile terminal 1610 conducts a search for a user's peripheral devices 1611 using the received peripheral threshold 1615 as the retrieval range 1616. Note here that when a user's peripheral device 1611 is simultaneously a peripheral device of the service device 1612, processing will be implemented in accordance with a particular policy (for example, recognize as the peripheral device with the lower access level).

Figure 17:
FIG. 17 is a schematic view of different peripheral distances for services according to an embodiment of the present invention.

FIG. 17 is a conceptual diagram of an example of different peripheral distances from a service in the present invention. The main components include the service 1710 and the peripheral distance 1711. The peripheral distance 1711, (radius of circular peripheral area) within which the user 0210 can implement a search, is prescribed to suit the service provided by the service device 0220. For example, the peripheral distance for a "door unlocking" service is "10 m" but the peripheral distance for a "door locking" service is "0 m".

Figure 18:
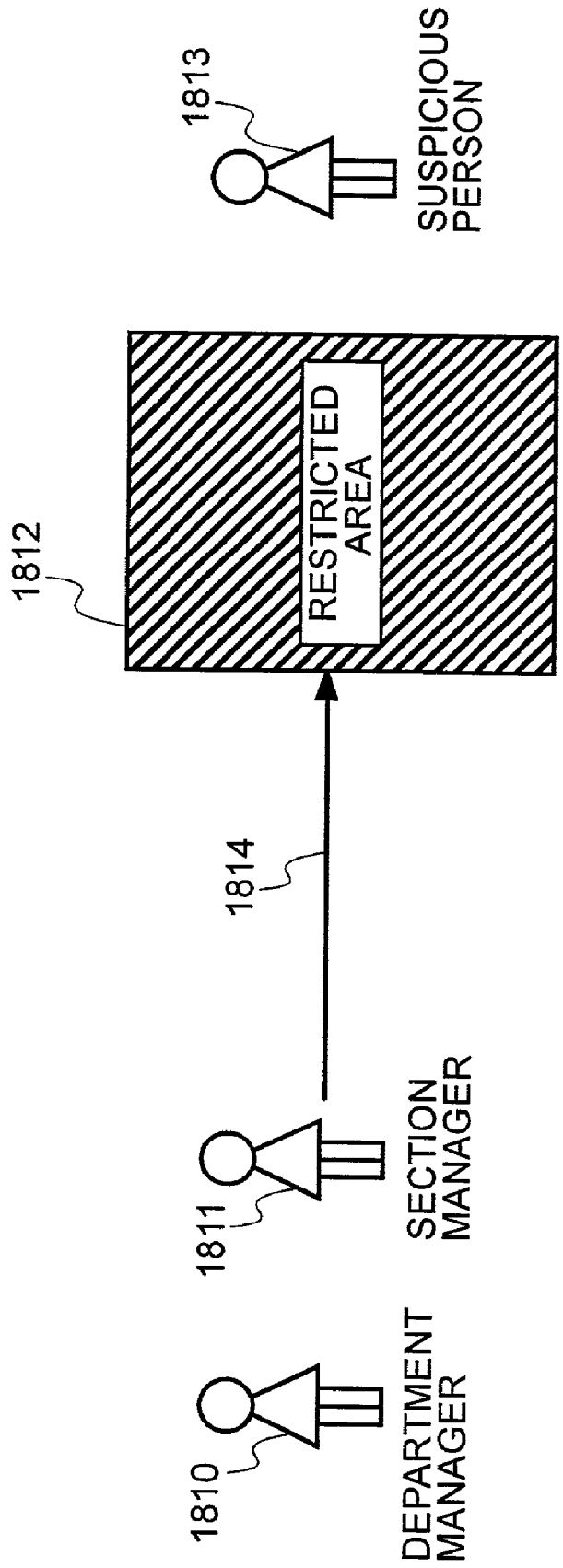
FIG. 18 is a schematic view that shows a first illustrative embodiment in which the access control method in the present invention is applied.

FIG. 18 is a schematic view of embodiment 1 in which an access control method in the invention is applied. The main components are a department manager 1810, section manager 1811, restricted area (safe) 1812, and a suspicious person 1813. The section manager 1811 has a PDA that acts as a mobile terminal 0211. The department manager 1810 has an ID card on which their personal information is registered. This is the manager's peripheral device 0218. In this application example, an electronic lock 1812 to a safe is the service device 0220. An unregistered object (for example, an ID card) held by the suspicious person 1813 is the equipment peripheral device 0228. Here, a summary of the application example of an access control system that uses the peripheral device information according to the present invention is as follows. "A section manager 1811 is not permitted to unlock the safe 1812 by himself but can unlock it when accompanied by a department manager 1810. Note that the safe cannot be unlocked when a suspicious person 1813 is detected in the vicinity of the safe 1812." A more detailed explanation is given below:

1. A section manager 1811 uses a PDA to send personal verification information user ID: usr__676001027, group ID: grp__105) or service information (requested service ID: safe unlocking) 1814. Note here that the personal verification information is stored in the PDA and the service information is selected by the user 0210 from the mobile terminal 0211 using the list of services that can be procured via the network. Note that when personal verification information is to be stored on the PDA, it is assumed that it will be stored using memory and a SIM or WIM card.

2. ID card information (peripheral device information: [info_udev]: {id.udev__001, stat.udev__001 . . . }), that is information about the PDA peripheral device, is sent with sent data to the electronic lock 1812. To avoid situations in which a department manager 1810 passes the section manager 1811 by chance, the department manager 1810 must clearly hold up their ID card to a reader.

3. The user's peripheral device information (including unique ID and status value) is acquired by the PDA using a common communication protocol (such as BT).

4. The electronic lock 1812 that receives the message 1814 (user ID, group ID, requested service ID, user's peripheral device information) from the PDA acquires unregistered object information (information relating to peripheral device around equipment: [info_ddev]: {id.ddev__001, stat.ddev__001, . . .}), that is information about a peripheral device around the equipment. The method for specifying that someone is a suspicious person 1813 is as follows. When, in response to a request made to the communication equipment (including an ID card) held by the suspicious person 1813, no answer is made despite the fact that communication can be established, the person is identified as a suspicious person 1813.

5. The access level is determined by referring to the data (user ID, group ID, requested service ID, user's peripheral device information, information about equipment peripheral devices) and the EACL in the electronic lock.

6. The electronic lock 1812 is controlled by the determined access level mode.

7. The service (service not to unlock the safe) is provided to the section manager 1811.

8. In addition, a security system also operates when there are important objects in the safe. It is also noted that when there are not important objects in the safe, the embodiment can allow the entry into the room by a multiplicity (for example, all registered persons) of users.

Figure 19:
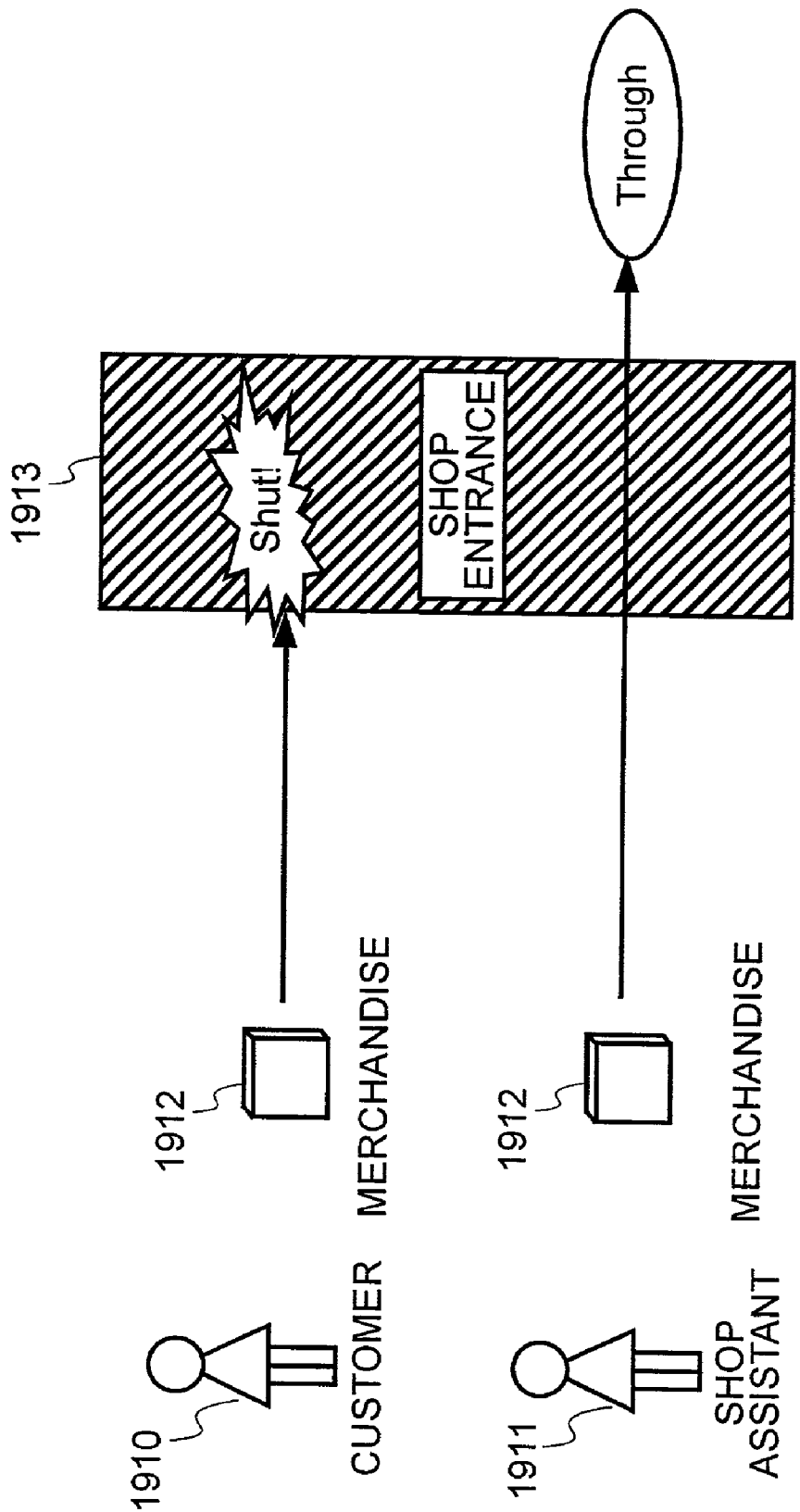
FIG. 19 is a schematic view that shows a second illustrative embodiment in which the access control method in the present invention is applied.

FIG. 19 is a summary view of embodiment 2 in which an access control method in the present invention is applied. The main components include a customer 1910, a shop assistant 1911, a product (such as a CD) 1912, and the shop entrance 1913. The shop assistant 1911 has a shop assistant card as a mobile terminal 0211. Tagged products (such as CDs) arranged in the shop front are viewed as the user's peripheral devices 0218.

Furthermore, the service device 0220 in this application example is a shop entrance 1913 near which is always located an alarm with a tag reader that checks for any unpaid-for products (such as CDs) being taken out. Specifically, information stating that a product has been paid for is written to the tag attached to a product (such as a CD) at the time of payment and this tag is read at the shop entrance 1913. The alarm will sound when the information read does not contain information stating that the item has been paid for and the person holding that product (such as a CD) is not the shop assistant. Here, the summary of the example of the application of an access control system that uses peripheral device information in the present invention is as follows. "An alarm will sound when a customer 1910 holding an unpaid-for product (such as a CD) 1912 nears the shop entrance 1913 but will not sound if a shop assistant 1911 passes through the entrance with a product (such as a CD) 1912." A more detailed explanation is given below:

1. When a customer 1910 attempts to pass through a shop entrance 1913 without having paid for a product, the product (such as a CD) tag (including information stating that it has not been paid for) is read by a reader that is always located near the entrance.

2. When the information read states that the product has not been paid for, the reader alarm will operate.

3. When a shop assistant 1910 attempts to pass through the shop entrance 1913 while holding a product (such as a CD) 1912 that has not been paid for, the shop assistant card held by the shop assistant 1911 and the product (such as a CD) tag (including information stating that it has not been paid for) is read by a reader that is always located near the entrance.

4. When the information read is shop assistant information, the reader will not operate the alarm regardless of the information relating to payment written on the tag of the product (such as a CD) 1912.

Figure 21:
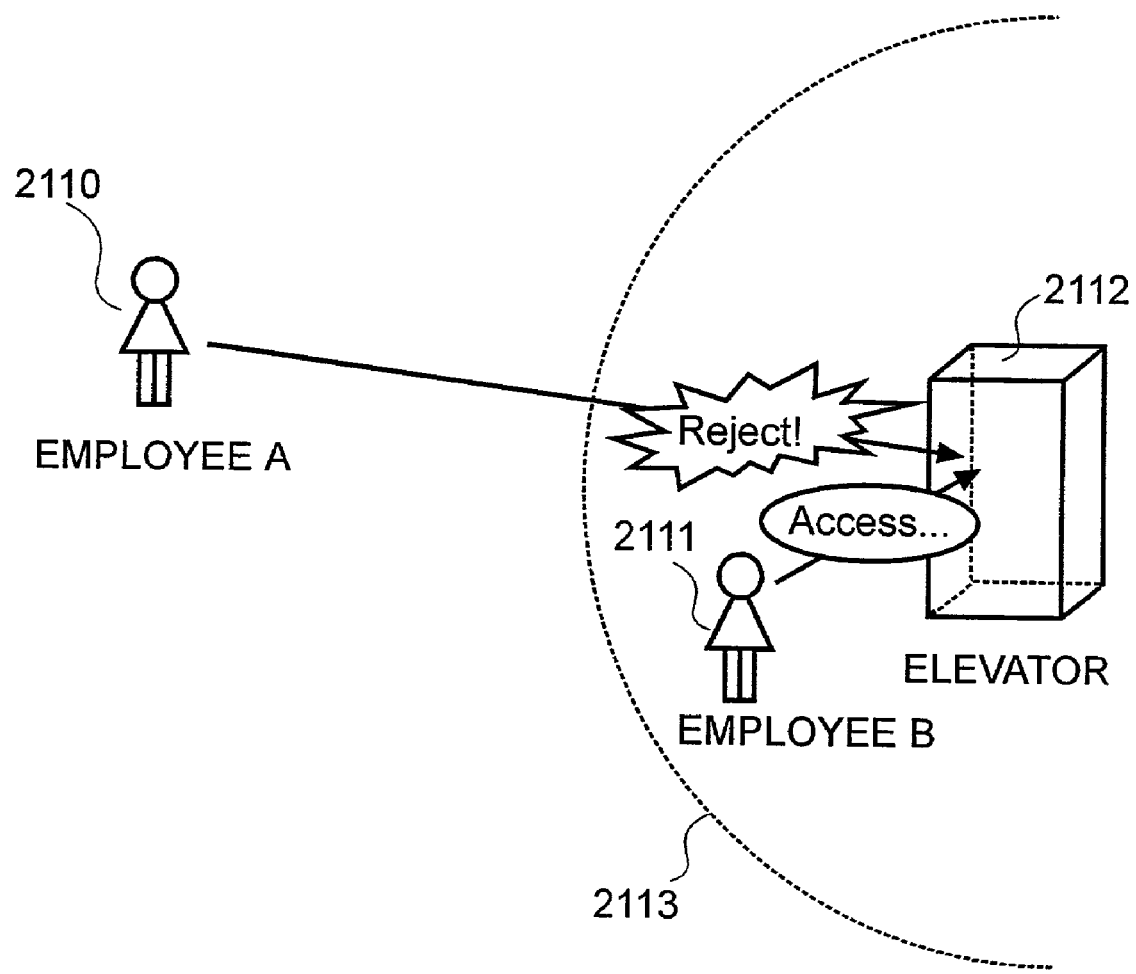
FIG. 21 shows the constitution of the system of a third illustrative embodiment in which the access control method in the present invention is applied.

FIG. 21 is a schematic view of embodiment 3 in which an access control method in the present invention is applied. The main components include employee A 2110, employee B 2111, and an elevator 2112. Employee A 2110 and employee B 2111 use a mobile terminal to call the elevator 2112 to the requested level. Employee A requests a service from a place that is more than a set distance (neighborhood distance threshold) 2113 from the elevator 2112 and employee B requests a service from within the circle formed with a radius that is the neighborhood distance threshold 2113. An overview of the example in which an access control system that uses peripheral device information according to the present invention is as follows. "Employee A 2110, who is in a place far away from the elevator (a place that is more than the neighborhood distance threshold 2113 away) cannot call elevator 2112 but employee B, who is close by (within the circular area of a radius equal to the neighborhood distance threshold 2113) can call the elevator 2112". A more detailed explanation is given below:

1. Employee A 2110 uses a mobile terminal to send a request message to elevator 2112 calling an elevator.

2. The distance between the elevator and the mobile terminal of employee A is measured using the time difference between the time that the message was sent from the mobile terminal and the time the message was received by the elevator 2112. Note here that any other method for measuring this distance can also be used.

3. Access to the elevator is not permitted when the distance measured above is greater than the neighborhood distance threshold 2113.

4. Conversely, when the measured distance is less than the neighborhood distance threshold as is the case with employee B 1211, access to the elevator is permitted and the service is provided to employee B 2111.

FIG. 22 is a schematic view of embodiment 4 in which an access control method in the present invention is applied. The main components include: an employee 2210, a suspicious person 2211, the mobile terminal 2212 of the employee, the mobile terminal 2213 of the suspicious person, the front gates 2214, a history information data base 2215, and a carried object 2216.

An overview of an example in which an access control system that uses the peripheral device information in the present invention is as follows. "Employee A who has a mobile terminal 2212 can pass through the front gate but a check is made on a suspicious person 2211 who is unable to send positive personal information despite having a mobile terminal 2213, who is carrying a carried object 2216, and who attempts to pass through the front gate. Through use of the history information data base 2215 of carried objects 2216 in conjunction with the peripheral equipment configuration, the suspicious person 2211 is not allowed to pass through the front gate." A more detailed explanation is given below:

1. When employee A 2210, who is carrying a mobile terminal 2212, attempts to pass through the front gates, personal information is acquired from the above mobile terminal 2212.

2. Reference is made to the in-house data base, for example, confirmation that above employee A is an employee is made, and then employee A is permitted to pass through the front gates.

3. Personal information cannot be obtained from the mobile terminal 2213 of a suspicious person 2211 carrying a mobile terminal 2213 and a carried object 2216 when they attempt to pass through the front gates. This also occurs when data containing personal information for example is intentionally not sent despite communication being established.

4. Reference is made to the history information data base 2215 of carried objects 2216.

5. The access level is determined when the targeted equipment 2611 (FIG. 26) is deemed to be the carried object 2216, the reference starting point 2612 is deemed to be the library, the reference end point 2613 is the front gates, and the history information 2614 is deemed to be the action history information of the suspicious person 2211 (time 2510, status (value) 2511, peripheral equipment 2512).

6. The access level obtained using the peripheral equipment configuration and the above access level are compared and the access level determined in accordance with a particular policy (for example, priority is given to the lowest access level).

7. Access control is implemented in accordance with the determined access level.

Figures 24, 25:
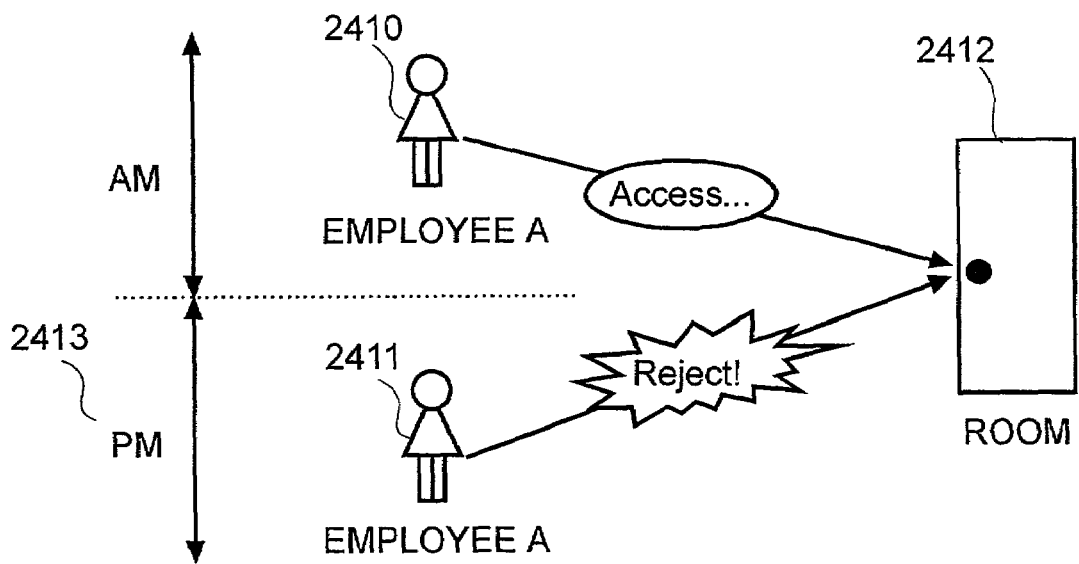
FIG. 24 shows the constitution of the system of a fifth illustrative embodiment in which the access control method in the present invention is applied.
FIG. 25 shows the constitution of a history information data base for users and equipment according to an embodiment of the present invention.

FIG. 25 is a schematic view of the history information data bases for users and equipment in the present invention. The main components include the time 2510, status (value) 2511, and peripheral equipment 2512. The time 2510 is the time (including date information) at which the history information relating to the targeted user or equipment was collected. The status (value) 2511 is the status value of the targeted user or equipment at time 2510. For example, when the target is books in a library, the status value could be "not borrowed" or "already borrowed". The peripheral equipment 2512 is equipment located around the targeted user or equipment at time 2510 and for status (value) 2511.

FIG. 26 shows the EACL when a history information data base is used in the present invention. The main components include an access level 2610, targeted equipment 2611, a reference starting point 2612, a reference end point 2613, and history information 2614. The access level 2610 is the access level for the targeted equipment 2611 determined in this EACL. The reference starting point 2612 is a starting point when the history information database 2215 is referenced. The reference end point 2613 is an ending point when the history information database 2215 is referenced. The history information 2614 is the action history information (status (value) 2510, time 2511, peripheral equipment 2512) for a targeted person between the reference start point 2612 for the targeted equipment 2611 and the reference end point 2613.

FIG. 24 is a schematic view of a system in embodiment 5, in which an access control method in the present invention is applied. The main components include employee A 2410 who requests a service in the morning, employee A 2411 who requests a service in the afternoon, and a room door 2412. An overview of an example in which an access control system that uses peripheral device information according to the present invention is as follows. "Employees A 2410 and 2411 can both enter the room if they apply to do so in the morning but cannot enter the room if they apply to do so in the afternoon." A more detailed explanation is given below:

1. During the morning, employee A 2410 sends a message to a room applying to enter the room.

2. The above message, as in above embodiment examples 1 through 4, contains the configuration and statuses of peripheral equipment.

3. Employee A 2410 is permitted to enter the room upon application during the morning.

4. However, even when the above peripheral equipment information is the same, employee A 2411 is not permitted to enter the room upon application during the afternoon.

5. This embodiment also includes examples in which permission to enter the room is issued according to the period of time during which a service is provided (for example, room use time), regardless of the time at which employees A 2410 or 2411 submit the application.

Figure 20:
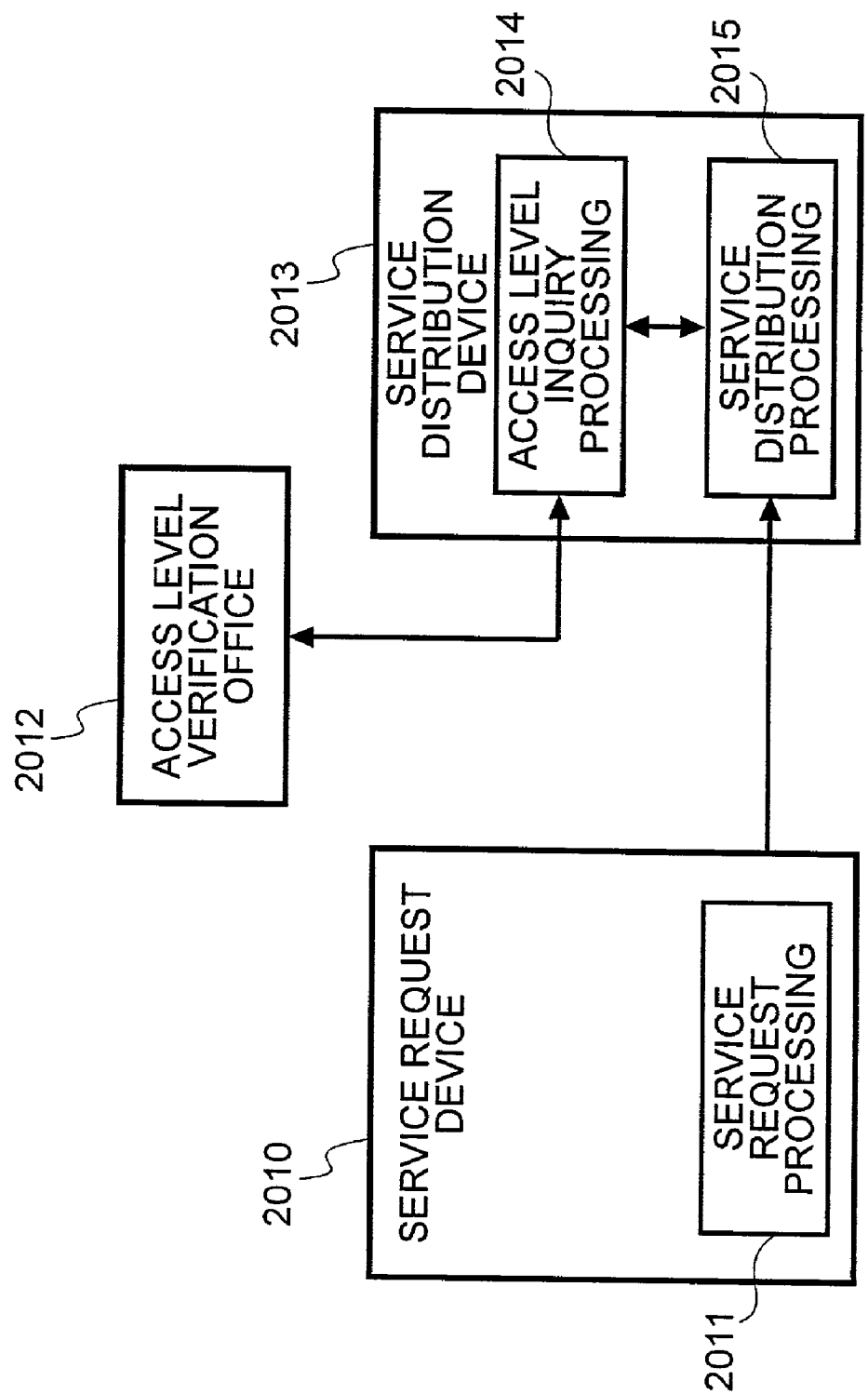
FIG. 20 shows the constitution of the system of a sixth illustrative embodiment in which the access control method in the present invention is applied.

FIG. 20 is a schematic view of a system in embodiment 6, in which an access method in the present invention is applied. The main components include a service requesting device 2010, access level verification office 2012, and a service distribution device 2013. The service requesting device sends a service request to the service distribution device 2013. Here, the service request is sent along with information relating to the user 2010 and the user's peripheral devices 0218. The service distribution device 2013 that receives the above request uses access level reference processing 2014 to refer to the access level in the access verification office 2012. At this time, the information received from the service requesting device 2010 and information relating to equipment peripheral devices 0228 is sent. The access level verification office 2012 that receives the above information uses the EACL to determine the access level and send this to the service distribution device 2013. The service distribution device 2013 that receives the above access level information provides a service to suit the received access level. An embodiment of a system that uses this configuration is equivalent to above embodiments 1 through 5.

The embodiments described above are configured as detailed above and produce the following effects: (1) accurate access control that includes the peripheral statuses of both the service recipient and the service sender is enabled; and (2) access control that can react with flexibility to changes in the statuses of users or service devices is enabled. The present invention enables services, such as access control, to be provided accurately. Variations and modifications of the disclosed illustrative embodiments of the present invention will no doubt suggest themselves to those skilled in the relevant arts. Accordingly, the foregoing discussions should be considered as illustrative and not in a limiting sense.

What is claimed is:

1. A method for operating a service a service device to provide a service comprising:
   detecting a request from a requesting device to provide said service;
   obtaining peripheral information relating to one or more peripheral devices, said peripheral devices being within a predetermined distance of said service device; and
   providing said service depending on said peripheral information,
   wherein said providing step is further dependent on history information which indicates an action history of a user of the requesting device between a reference starting point and a reference end point, and which includes a time at which said history information was obtained, and
   wherein said providing step determines a first access level based on said peripheral information and a second access level based on said history information, compares said first access level and said second access level, and provides said service depending on a result of said comparison.

2. The method of claim 1 wherein said peripheral information further includes information relating to whether one of said peripheral devices is within said predetermined distance of said service device.

3. The method of claim 1, wherein:
   obtaining peripheral information includes obtaining peripheral information relating to one or more peripheral devices in a room; and
   wherein said peripheral information includes information relating to positions of said peripheral devices relative to said requesting device, the information relating to positions determined wing a time difference between a first time at which said request was sent from said requesting device and a second time at which said request was received by said service device.

4. The method of claim 3 further including obtaining second peripheral information relating to positions of one or more second peripheral devices relative to said service device.

5. The method of claim 4 wherein said second peripheral information for each of said second peripheral devices is obtained from said each second peripheral device or from a data store separate from said each second peripheral device.

6. The method of claim 1 wherein said history information further includes a status of a service object or said user, at said time, and peripheral information of one or more peripheral devices of said service object or said user, at said time.

7. The method of claim 6 wherein said status indicates whether said user has already borrowed said service object at said time.

8. The method of claim 1 wherein said providing step further provides said service depending on a lower access level of said first and second access levels.

9. The method of claim 1 wherein said peripheral information includes both of information relating to one or more peripheral devices of said user and information relating to one or more peripheral devices of said service device.

10. The method of claim 9 further comprising:
    detecting said one or more peripheral devices of said user in said requesting device;
    transferring said information of said one or mare peripheral devices of said user from said requesting device to said service device;
    detecting said one or more peripheral devices of said service device in said service device; and
    determining an access level based on said information of said one or more peripheral devices of said user and said information of said one or more peripheral devices of said service device,
    wherein said providing step provides said service depending on said service level.

11. The method of claim 10 further comprising:
    determining a peripheral threshold based on user information from said requesting device and service device information,
    wherein said detecting step for said requesting device detects said one or more peripheral devices of said user based on said peripheral threshold.

* * * * *